United States Patent
Beardsley et al.

(10) Patent No.: US 9,992,482 B2
(45) Date of Patent: Jun. 5, 2018

(54) SYSTEMS, METHODS, AND APPARATUSES FOR STEREOSCOPIC IMAGING

(71) Applicants: Disney Enterprises, Inc., Burbank, CA (US); ETH Zürich (Eidgenössische Technische Hochschule Zürich), Zürich (CH)

(72) Inventors: Paul Beardsley, Zurich (CH); Javier Alonso Mora, Sommerville, MA (US)

(73) Assignees: Disney Enterprises, Inc., Burbank, CA (US); ETH ZÜRICH, Zürich (CH)

(*) Notice: Subject to any disclaimer, the term of this patent is extended or adjusted under 35 U.S.C. 154(b) by 195 days.

(21) Appl. No.: 14/839,374

(22) Filed: Aug. 28, 2015

(65) Prior Publication Data
US 2017/0064290 A1    Mar. 2, 2017

(51) Int. Cl.
*H04N 13/02* (2006.01)
*H04N 5/225* (2006.01)
(Continued)

(52) U.S. Cl.
CPC ....... *H04N 13/0285* (2013.01); *G02B 17/061* (2013.01); *G02B 27/0012* (2013.01); *G06T 7/85* (2017.01); *H04N 5/2252* (2013.01); *H04N 5/332* (2013.01); *H04N 13/0242* (2013.01); *H04N 13/0296* (2013.01); *H04N 2213/001* (2013.01)

(58) Field of Classification Search
CPC ............. H04N 13/0285; H04N 5/2252; G02B 17/061; G02B 2027/0134; G02B 27/0012
See application file for complete search history.

(56) References Cited

U.S. PATENT DOCUMENTS

| 6,226,035 B1* | 5/2001 | Korein | G02B 13/06 348/335 |
| 6,313,865 B1* | 11/2001 | Driscoll, Jr. | G02B 13/06 348/36 |

(Continued)

OTHER PUBLICATIONS

Kuniaki Kawabata, Hideo Sato, Tsuyoshi Suzuki and Yoshito Tobe (2010). A Wireless Camera Node with Passive Self-righting Mechanism for Capturing Surrounding View, Vision Sensors and Edge Detection, Francisco Gallegos-Funes (Ed.), ISBN: 978-953-307-098-8, InTech, Available from: http://www.intechopen.com/books/vision-sensors-and-edge-detection/a-wireless-camera-node-with-passiveself-righting-mechanism-for-capturing-surrounding-view, 17 pages.

(Continued)

*Primary Examiner* — Obafemi Sosanya
(74) *Attorney, Agent, or Firm* — Sheppard Mullin Richter & Hampton LLP

(57) ABSTRACT

An omnidirectional camera apparatus configured to facilitate omnidirectional stereo imaging is described. The apparatus may include a first convex mirror, a first camera disposed at the first convex mirror, a second convex mirror, and a second camera disposed at the second convex mirror. The first convex mirror and the second convex mirror may be arranged such that a first mirrored surface of the first convex mirror and a second mirrored surface of the second convex mirror may face each other. The first camera may capture imagery reflected off the second convex mirror. The second camera may capture imagery reflected off the first convex mirror. A method of calibrating an omnidirectional camera apparatus is also described.

9 Claims, 6 Drawing Sheets

(51) Int. Cl.
*G02B 17/06* (2006.01)
*G02B 27/00* (2006.01)
*G06T 7/80* (2017.01)
*H04N 5/33* (2006.01)
*G02B 13/06* (2006.01)

(56) References Cited

U.S. PATENT DOCUMENTS 9,058,521 B2 * 6/2015 Yoon ............... G06K 9/00664
2003/0081952 A1 * 5/2003 Geng ................ G03B 17/00
 396/427
2008/0062255 A1 * 3/2008 Gal ............... G08B 13/19628
 348/37

OTHER PUBLICATIONS

Tang, Y., Wang, Q., Zong, M. et al. "Design of Vertically-aligned Binocular Omnistereo Vision Sensor" College of Information Engineering, Zhejiang University of Technology, Hangzhou, China; (2010), 34 pages.

Sooyeong Yi and Narendra Ahuja (2007). A Novel Omnidirectional Stereo Vision System with a Single Camera, Scene Reconstruction Pose Estimation and Tracking, Rustam Stolkin (Ed.), ISBN: 978-3-902613-06-6, InTech, Available from: http://www.intechopen.com/books/scene_reconstruction_pose_estimation_and_tracking/a_novel_omnidirectional_stereo_vision_system_with_a_single_camera.

* cited by examiner

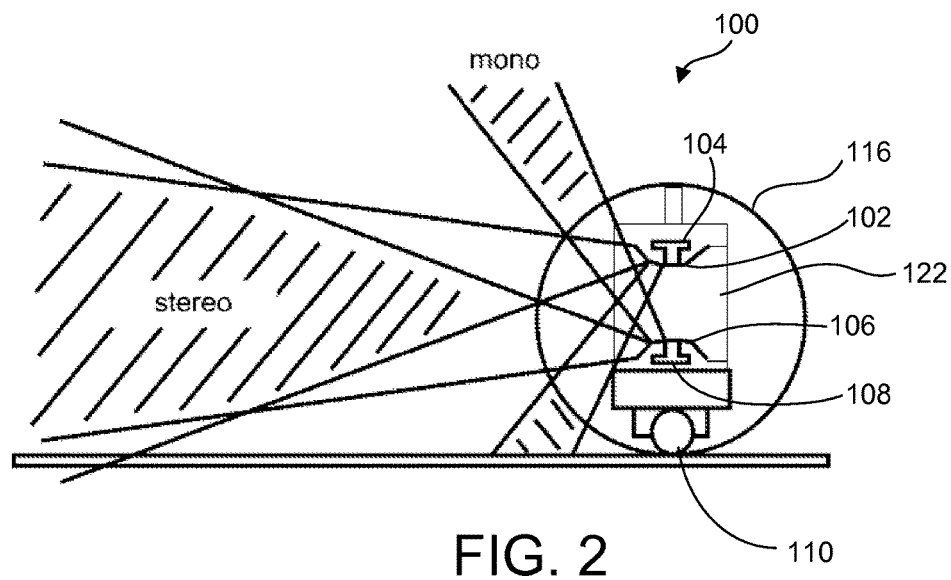
FIG. 2
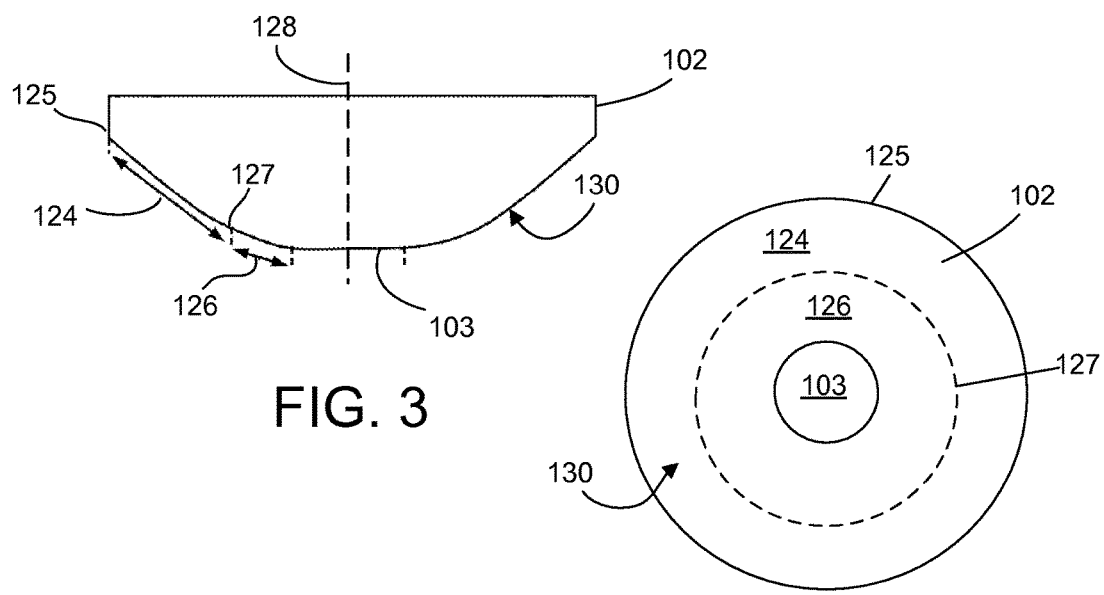
FIG. 3
FIG. 4

SYSTEMS, METHODS, AND APPARATUSES FOR STEREOSCOPIC IMAGING

FIELD OF THE DISCLOSURE

This disclosure relates to systems, methods, and apparatuses for stereoscopic imaging.

BACKGROUND

Robots may be used for entertainment, utilitarian, and/or other purposes. A plurality of robots may be deployed in an environment and programmed to carry out one or more tasks. A plurality of robots in such a scenario may be referred to as a "robot swarm." It is often desired for the robots within the swarm to be "aware" of each other. Individual ones of the robots and/or a central processing unit may carry out localization processes including determining relative location, speed, direction of movement, and/or other information about individual ones of the robots. A tracking system may be used for localization. Tracking systems include, for example, onboard tracking systems, external tracking systems, optical tracking (e.g., camera tracking/imaging), wireless communication systems established between two or more robots and/or between a robot and a central processor, global positioning systems (GPS), and/or other system.

By way of non-limiting example, tracking may be accomplished by optical tracking systems including one or more cameras and/or processors configured to determine information about the location, speed, direction of movement, and/or other localization parameters about objects from captured images/video. Optical tracking systems may provide millimeter-accuracy localization of robots or other objects within an environment. However, optical tracking systems have high cost, require a fixed infrastructure, may be constrained to line-of-sight image capturing, and/or may have other drawbacks.

Wireless communication solutions may include ultra-wide band (UWB), radio frequency identification (RFID), and/or other wireless communication between robots and/or a central processing unit. These and other wireless communication solutions may encounter interference in wirelessly active environments and multi-path issues in multi-robot setups.

Differential global positioning systems (DGPS) are another tracking technique. However, this technique may be restricted to outdoor use only and/or may be blocked by buildings and/or other structures.

On-board localization may be used for localization relative to landmarks and neighboring robots and/or for relative localization to enable collision avoidance. This technique imposes a cost per unit, an issue for swarms of tens to hundreds of robots.

SUMMARY

Accordingly, one aspect of the disclosure relates to a system for omnidirectional stereo camera imaging for on-board localization of an omnidirectional stereo camera apparatus. In some implementations, the omnidirectional stereo camera apparatus may be incorporated into a movable robot platform, and/or other type of platform. By way of non-limiting example, a movable robot platform may comprise a robot used in an amusement park, and/or other types of robots.

In some implementations, the omnidirectional stereo camera apparatus may include a first convex mirror, a second convex mirror, a first camera, a second camera, and/or other components. The first convex mirror may include a first principle axis, a first mirrored surface, a first central portion disposed along the first principle axis, and/or other components. In some implementations, the first central portion may be configured to allow light to pass through the first central portion. In some implementations, the first camera may be disposed behind the first convex mirror. The first camera may be aligned with the first principle axis such that light passing through the first central portion of the first convex mirror impinges on the first camera.

The second convex mirror may include a second principle axis, a second mirrored surface, a second central portion disposed along the second principle axis, and/or other components. In some implementations, the second central portion may be configured to allow light to pass through the second central portion. In some implementations, the second camera may be disposed behind the second convex mirror. The second mirror may be aligned with the second principle axis such that light passing through the second central portion of the second convex mirror impinges on the second camera.

In some implementations, the first convex mirror and the second convex mirror may be arranged such that the first principle axis and the second principle axis may be aligned. The first mirrored surface and the second mirrored surface may face each other. The first camera may be configured to capture imagery reflected by the second convex mirror (e.g., the second mirror surface). The second camera may be configured to capture imagery reflected by the first convex mirror (e.g., the first mirrored surface).

Another aspect of the disclosure relates to a method of calibrating an omnidirectional stereo camera apparatus. The method may be implemented in a computer system including one or more physical processors and storage media storing machine-readable instructions.

At an operation, one or more system models may be estimated. A given system model may comprise model estimations of one or more of the shapes and/or positions of convex mirrors, positions of one or both of the first and second cameras, and/or other components included in the omnidirectional camera apparatus. By way of non-limiting example, a first system model may be estimated. The first system model may comprise estimates of one or more of a first shape of a first convex mirror, a second shape of a second convex mirror, a first position of the first convex mirror, a second position of the second convex mirror, a third position of a first camera, a fourth position of a second camera, and/or other estimations. In some implementations, one of more of the first position, second position, third position, and/or fourth position may be initially provided as a fixed origin position.

At an operation, imagery captured by a first camera and/or a second camera may be obtained. A reference object may be positioned in three-dimensional space adjacent the omnidirectional stereo camera apparatus. The imagery may depict representations of a reference object included in reflections off the first convex mirror and/or second convex mirror. The imagery may include one or more of a first image comprising a first representation of the reference object captured by the first camera, a second image comprising a second representation of the reference object captured by the second camera, and/or other images.

At an operation, first position information corresponding to the first representation of the reference object in the first image may be determined. At the same or a different operation, second position information corresponding to the second representation of the reference object in the second image may be determined.

At an operation, a reconstruction of the reference object may be estimated. The reconstruction may be based on one or more of the first model the first position information, the second position information, and/or other information. The reconstruction may comprise a three-dimensional reconstruction of the reference object.

At an operation, the reconstruction of the reference object may be reprojected onto one or more two dimensional image planes. By way of non-limiting example, the reconstruction of the reference object may be reprojected onto a first plane, a second plane, and/or other planes.

At an operation, third position information corresponding to the reprojected reference object in the first plane may be determined. In the same or a different operation, fourth position information corresponding to the reprojected reference object in the second plane may be determined.

At an operation, system models may be updated based on discrepancies between the reprojections and the captured imagery. By way of non-limiting example, the first system model may be updated based on the reprojections of the reference object. The update of the first system model may comprise updating the estimates of one or more of the first shape of the first convex mirror, the second shape of the second convex mirror, the first position of the first convex mirror, the second position of the second convex mirror, the third position of the first camera, the fourth position of the second camera, and/or other aspects of the first system model. By way of non-limiting example, the updates of the estimates may be based on one or more of a difference between the first position information and the third position information, a difference between the second position information and the fourth position information, and/or other information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise.

BRIEF DESCRIPTION OF THE DRAWINGS

FIG. 2 illustrates a side cross-sectional view of the apparatus of FIG. 1 depicting field-of-view lines, in accordance with one or more implementations.

FIG. 3 illustrates a side cross-sectional view of a convex mirror used in an omnidirectional stereo camera apparatus, in accordance with one or more implementations.

FIG. 4 illustrates a top view of a convex mirror used in an omnidirectional stereo camera apparatus, in accordance with one or more implementations.

DETAILED DESCRIPTION

Figure 1:
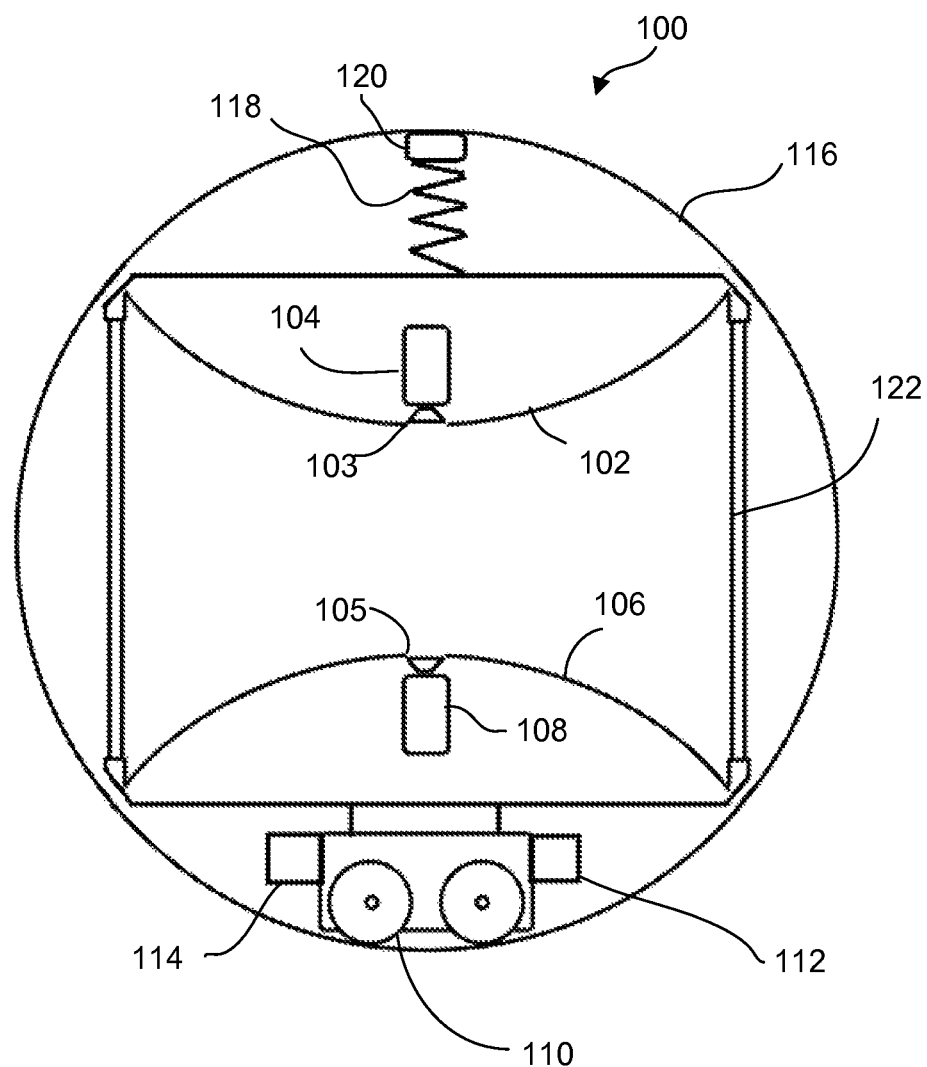
FIG. 1 illustrates a side cross-sectional view of an omnidirectional stereo camera apparatus, in accordance with one or more implementations.

FIG. 1 illustrates an omnidirectional stereo camera system showing a cross-sectional view of an omnidirectional stereo camera apparatus 100, in accordance with one or more implementations. In some implementations, the apparatus 100 and/or components thereof may be disposed as part of a robot and/or other movable or stationary platform. By way of non-limiting example, the apparatus 100 may be used as part of a robot swarm (e.g., one or more robots, including a central processing unit and/or one or more satellite units). Although the figures shown and described herein relate to an apparatus 100 configured to move on a ground surface, in some implementations an apparatus having the same or similar components as apparatus 100 may be configured for on a stationary platform, a flying platform, a swimming platform, a submergible platform, and/or other type of platform.

In some implementations, the apparatus 100 may include a first convex mirror 102, a second convex mirror 106, a first camera 104, a second camera 108, and/or other components. In some implementations, the first camera 104 may be embedded inside and/or disposed behind the first convex mirror 102. In some implementations, the second camera 108 may be embedded inside and/or disposed behind the second convex mirror 106. The first convex mirror 102 may include a first central portion 103. The first central portion 103 may allow the first camera 104 to view the opposing second convex mirror 106. The second convex mirror 106 may include a second central portion 105. The second central portion 105 may allow the second camera 108 to view the opposing first convex mirror 102. This configuration may enable the apparatus 100 to have a compact design. In some implementations, a configuration of the apparatus 100 may facilitate capturing stereo omnidirectional views of an environment using the opposing camera/mirror pairs (see, e.g., FIG. 2).

In FIG. 2, the first convex mirror 102 and second convex mirror 106 may be configured to facilitate a stereo field of view (FOV), a monocular FOV, and/or other views by the opposing first camera 104 and second camera 108. By way of non-limiting example, a stereo FOV based on reflections depicting a horizontal direction relative the omnidirectional camera apparatus 100 (labeled "stereo" in FIG. 2) may be facilitated by a first portion (see, e.g., FIG. 3 and FIG. 4) of the mirrors. By way of non-limiting example, a monocular FOV based on reflections depicting a floor and/or ceiling in the vicinity of the omnidirectional camera apparatus 100 (labeled "mono" in FIG. 2) may be facilitated by a second portion (see, e.g., FIG. 3 and FIG. 4) of the mirrors. In some implementations, the monocular FOV may be used for localizing the apparatus 100 in an environment (e.g., determining location, speed, orientation, and/or other parameters). In some implementations, the stereo FOV may be used to determine (e.g., localize) a position and/or orientation of an object detected in reflections off of the mirrors.

In some implementations, stereoscopic imaging based on images captured by both the first camera 104 and second camera 108 may be facilitated by synchronizing image capture between the first camera 104 and the second camera 108. Synchronization may accomplished by linking the cameras together (e.g., wired or wirelessly). By way of non-limiting example, the one or more processor 112 may be configured to control operation of the first camera 104 and/or second camera 108 such that a triggering of the first camera 104 causes a triggering of the second camera 108, and/or vice versa.

Returning to FIG. 1, in some implementations, the apparatus 100 may include a support structure 122, a drive mechanism 110 (e.g., a drive motor and/or wheels), a power supply (not shown), electronic storage (not shown), one or more processors 112, a communication component 114 (e.g., transmitter and/or receiver), and/or other components. The support structure 122 may comprise a frame and/or other support used to mount the first convex mirror 102, second convex mirror 106, and/or other components of the apparatus 100 to form a unitary structure within a spherical shell 116, in accordance with one or more configurations shown and described herein.

In some implementations, the spherical shell 116 may be used for housing one or more components of the apparatus 100 (e.g., the components supported by the support structure 122). A biasing mechanism may be configured to maintain a position of the support structure 122 inside the shell 116. The biasing mechanism may include a spring 118, a low-friction (or rolling) slider 120, and/or other components. The slider 120 may be made from Teflon or other suitable low-friction material. The support structure 122 may rotate independently from the shell 116. The drive mechanism 110 may effectuate rotational motion of the shell 116 independently of the support structure 122. The rotation of the shell 116 independently of the support structure 122 may cause the apparatus 100, including the shell 116, to move about in a desired manner. This may generally be referred to as "hamster-ball movement" since this configuration may allow the apparatus 100 to move in an environment much like a hamster in a hamster ball. In some implementations, the apparatus 100 may be arranged such that the center of gravity of one or more components of the apparatus 100 may be positioned below (or offset from) the geometric center of the shell 116, and/or may be arranged in other ways. In some implementations, the lower the center of gravity, the more stable the apparatus 100 may be. By way of non-limiting example, when the center of gravity is offset lower than the geometric center, the support structure 122 may maintain an upright position relative the shell 116 during dynamic movement.

In some implementations, the omnidirectional camera apparatus 100 may be configured without the spherical shell 116. In some implementations, the omnidirectional camera apparatus 100 may maneuver using the drive mechanism 110 directly in contact with a ground surface and/or other surface. The drive mechanism 110 may include one or more of a drive motor, one or more wheels, gears, servos, and/or other driving components. In some implementations, the apparatus 100 may be configured with a drive mechanism 110 and/or other components that may facilitate flight, amphibious transportation (e.g., surface transportation and/or underwater), and/or other methods of transportation.

In some implementations, the construction of the first convex mirror 102 and/or second convex mirror 106 may be based off of a virtual three-dimensional model having a desired mirror shape. By way of non-limiting example, computer-aided drafting (CAD) techniques may facilitate generating a virtual three-dimensional model. The virtual three-dimensional model may be used to make a physical three-dimensional model (e.g., print) of the first and second mirrors 102, 106. By way of non-limiting example, a three-dimensional printer and/or other rapid-prototyping device may be used to make a physical model. The physical model may be formed from plastic, wood, metal, polymers, and/or other materials. A surface of the physical model that is to be a mirrored surface may then be sanded, polished, and/or finished in other ways in preparation of receiving a coating of reflective material. The surface of the physical model may be coated in a reflective material to provide the mirrored surface to form a finished convex mirror. By way of non-limiting example, a mirrored surface may be provided using chroming techniques and/or other reflective surface-forming techniques. By way of non-limiting example, vapor deposition techniques may be used to apply a thin coat of reflective material on a surface of the physical model. Other techniques for providing a mirrored surface may include silvering using a silver spray, chrome electroplating, vacuum deposition of chrome, aluminum, or other metal, and/or other techniques. In some implementations, the first convex mirror 102 and/or second convex mirror 106 may be formed by other techniques, including milling and polishing aluminum and/or other material, casting a material to the desired shape, machining, powder metallurgy, three-dimensional printing, chroming over plastic models, and/or other techniques.

FIG. 3 and FIG. 4 show an implementation of the first convex mirror 102. The first convex mirror 102 may be radially symmetric about a first principal axis 128 and/or may have some variances in radial symmetry. The first convex mirror 102 may be defined generally by a cross-sectional profile (see, e.g., FIG. 3) comprising a first portion 124, a second portion 126, first central portion 103, and/or other portions. The profile of the first portion 124 may be defined by a first function. The first function may be a hyperbolic function and/or other function. The first portion 124 may encompass a first area of a first mirrored surface 130 of the first convex mirror 102. The first area may comprise a surface area of the first mirrored surface 130 between an edge 125 of the first convex mirror 102 and an intermediate location 127. The intermediate location 127 may be positioned between the edge 125 and the first central portion 103. For example, the intermediate location 127 may be substantially midway between the edge 125 and the first central portion 103.

In some implementations, the second portion 126 may be defined by a second function. The second function may be a polynomial function (e.g., linear or quadratic function) and/or other function. The second portion 126 may encompass a second surface area of the first mirrored surface 130 located between the intermediate location 127 and the first central portion 103. It is noted that the second convex mirror 106 may be similarly shaped.

It is noted that the above descriptions of the construction, profile, and/or shape of the first convex mirror 102 and/or second convex mirror 106 are not intended to be limiting. Instead, they are provided as an illustrative example and should not be considered limiting with respect to how the mirrors may be constructed, including various profiles and/or shapes of the mirrors.

Figure 5:
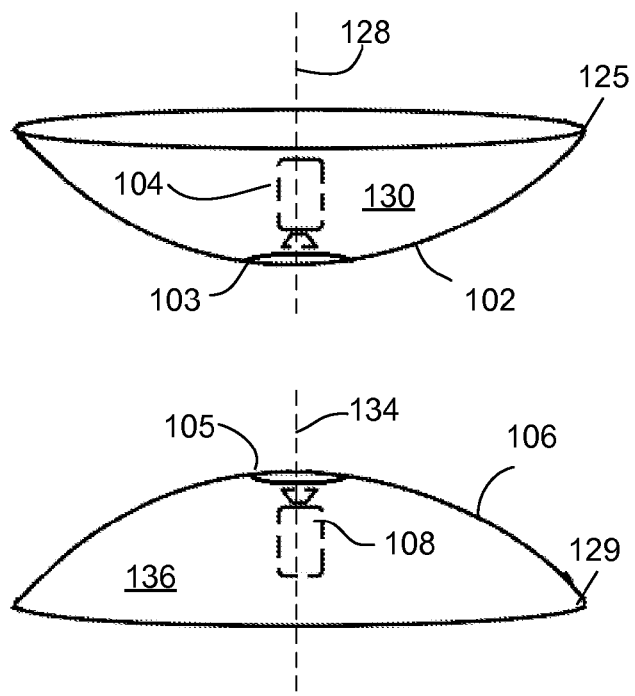
FIG. 5 illustrates a camera/mirror pair configuration used in an omnidirectional stereo camera apparatus, in accordance with one or more implementations.

FIG. 5 illustrates an implementation of a configuration of the first convex mirror 102, the first camera 104, the second convex mirror 106, and the second camera 108 within the apparatus 100 (noting that the apparatus 100 is not shown in its entirety in FIG. 5 for clarity). The first camera 104 may be disposed behind the first convex mirror 102 and/or the first mirrored surface 130. The first camera 104 may be aligned with the first principle axis 128 of the first convex mirror 102 such that light passing through the first central portion 103 of the first convex mirror 102 may impinge on the first camera 104. In some implementations, the first central portion 103 may comprise an aperture communicating through the first convex mirror 102. In some implementations, the first central portion 103 may comprise a passage communicating through the first convex mirror 102. In some implementations, the first central portion 103 may comprise a transparent or semitransparent portion of the first convex mirror 102 (e.g., a transparent or semitransparent portion of the first mirrored surface 130). The first central portion 103 may allow at least some light to pass through the first mirrored surface 130. By way of non-limiting example, when forming the first mirrored surface 130 on the first convex mirror 102, the first central portion 103 may be coated in a less-reflective material than a material disposed on the first mirrored surface 130 and/or other material that may be at least semi-transparent.

In FIG. 5, the second camera 108 may be disposed behind the second convex mirror 106 and/or a second mirrored surface 136 of the second convex mirror 106. The second camera 108 may be aligned with a second principle axis 134 of the second convex mirror 106 such that light passing through a second central portion 105 of the second convex mirror 106 may impinge on the second camera 108. In some implementations, the second central portion 105 may comprise an aperture communicating through the second convex mirror 106. In some implementations, the second central portion 105 may comprise a passage communicating through the second convex mirror 106. In some implementations, the second central portion 105 may comprise a transparent or semitransparent portion of the second convex mirror 106 (e.g., a transparent or semitransparent portion of the second mirrored surface 136). The second central portion 105 may allow at least some light to pass through the second mirrored surface 136. By way of non-limiting example, when forming the second mirrored surface 136 on the second convex mirror 106, the second central portion 105 may be coated in a less-reflective material than a material disposed on the second mirrored surface 136 and/or other material that may be at least semi-transparent.

In some implementations, the first convex mirror 102 and the second convex mirror 106 may arranged such that the first principle axis 128 and the second principle axis 134 may be aligned. The first mirrored surface 130 and the second mirrored surface 136 may face each other, as shown in FIG. 5. The first camera 104 may be configured to capture imagery reflected by the second convex mirror 106. The second camera 108 may be configured to capture imagery reflected by the first convex mirror 102.

Figure 6:
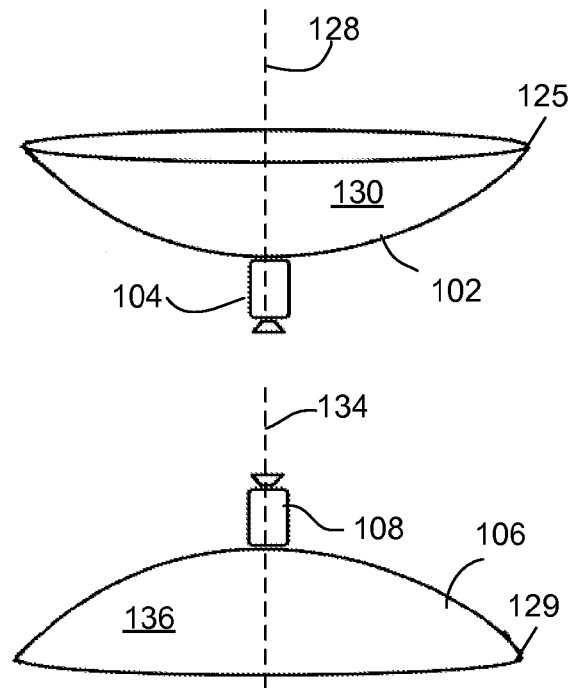
FIG. 6 illustrates another camera/mirror pair configuration used in an omnidirectional stereo camera apparatus, in accordance with one or more implementations.

FIG. 6 illustrates an implementation of a configuration of the first convex mirror 102, the first camera 104, the second convex mirror 106, and/or the second camera 108 of the apparatus 100 (noting that the apparatus 100 is not shown in its entirety in FIG. 6 for clarity). The first camera 104 may be disposed in front of the first mirrored surface 130. The first camera 104 may be aligned with the first principle axis 128. The second camera 108 may be disposed in front of the second mirrored surface 136. The second camera 108 may be aligned with the second principle axis 134. The first convex mirror 102 and the second convex mirror 106 may arranged such that the first principle axis 128 and the second principle axis 134 may be aligned. The first mirrored surface 130 and the second mirrored surface 136 may face each other. The first camera 104 may be configured to capture imagery reflected by the second convex mirror 106. The second camera 108 may be configured to capture imagery reflected by the first convex mirror 102.

It is noted that the above descriptions of arrangements of the first convex mirror 102, the first camera 104, the second convex mirror 106, and/or the second camera 108 are not intended to be limiting. Instead, they are provided as an illustrative example and should not be considered limiting with respect to how the apparatus may be configured such that the first camera 104 may be configured to capture imagery reflected by the second convex mirror 106 and the second camera 108 may be configured to capture imagery reflected by the first convex mirror 102.

In FIG. 1, in some implementations, one or more processors (e.g., processors 112) communicatively coupled to the apparatus 100 may carry out one or more stereoscopic-imaging processes to determine information about an ambient environment of the apparatus 100. For example stereoscopic three-dimensional measurement and/or three-dimensional reconstruction techniques may be employed to accomplish one or more of apparatus 100 localization (e.g., determination of position and/or orientation within an environment); remote object detection, identification, and/or tracking; and/or scene reconstruction using images captured from the first camera 104 and second camera 108. By way of non-limiting example, object recognition and/or other techniques may detect points on images captured by the first camera 104 and second camera 108. The images may include reflections off the first convex mirror 102 and second convex mirror 106. One or more processors 112 may be configured to determine position and/or orientation information about the detected points lying on the two-dimensional image planes. One or more processors 112 may be configured to perform coordinate transformations and/or other stereoscopic-imaging techniques to transform these points in two-dimensional space to points in three-dimensional space using known or estimated shapes of the first convex mirror 102 and/or second convex mirror 106.

Figure 11:
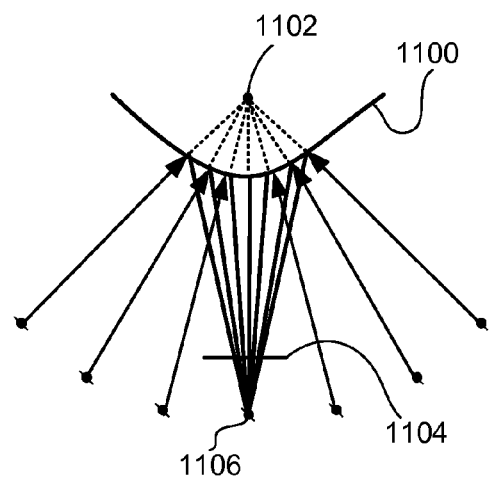
FIG. 11 illustrates an exemplary diagram of ray trace lines of a convex mirror having a central mirror intersection point, in accordance with one or more implementations.

FIG. 11 illustrates a ray-trace diagram of a mirror shape that facilitates the assumption that all outgoing rays from the mirror 1100 may intersect in a central virtual viewpoint 1102. Based on a known shape of the mirror 1100, the central virtual viewpoint 1102 may be used to determine a central mirror intersection point 1106. The central mirror intersection point 1106 may represent a camera position configured to capture images reflected off the mirror 1110.

An image plane 1104 representing a two-dimensional view of the incident rays reflecting off the mirror 1110 is also shown. In general, the diagram in FIG. 11 comprises a central camera system that facilitates three-dimensional localization of objects depicted in the reflections, based on coordinate transformations, with a high degree of accuracy.

In some implementations, the formation of the first convex mirror 102 and second convex mirror 106 may result in irregularities and/or an arbitrary shape of the mirrored surfaces thereof. For example, irregularities may occur as a result of hand-sanding and/or polishing of the mirrored surfaces of the convex mirrors. These irregularities may no longer allow for the assumption that all outgoing rays will intersect a common, central virtual viewpoint nor that a mirror intersection point will be centrally located.

Figure 12:
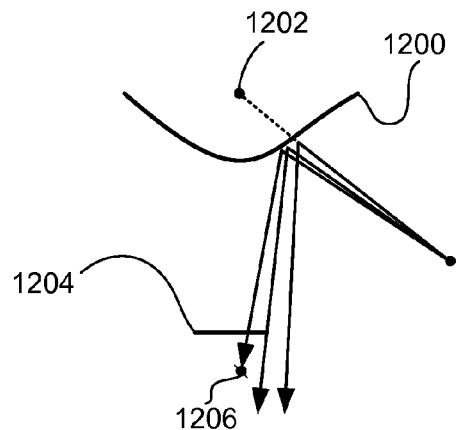
FIG. 12 illustrates an exemplary diagram of ray trace lines of a convex mirror having a non-central mirror intersection point showing an iterative process for finding such a point in accordance with one or more calibration implementations.

FIG. 12 shows a diagram of an iterative procedure that may be implemented to find an intersection point 1206. First, an initial guess may be calculated by assuming the camera system to include a central virtual viewpoint 1202 (e.g., similar to FIG. 11). The mirror intersection point 1206 may then be iteratively found by minimizing the distance between an incident ray and a camera center. Image plane 1204 is also depicted.

Figure 7:
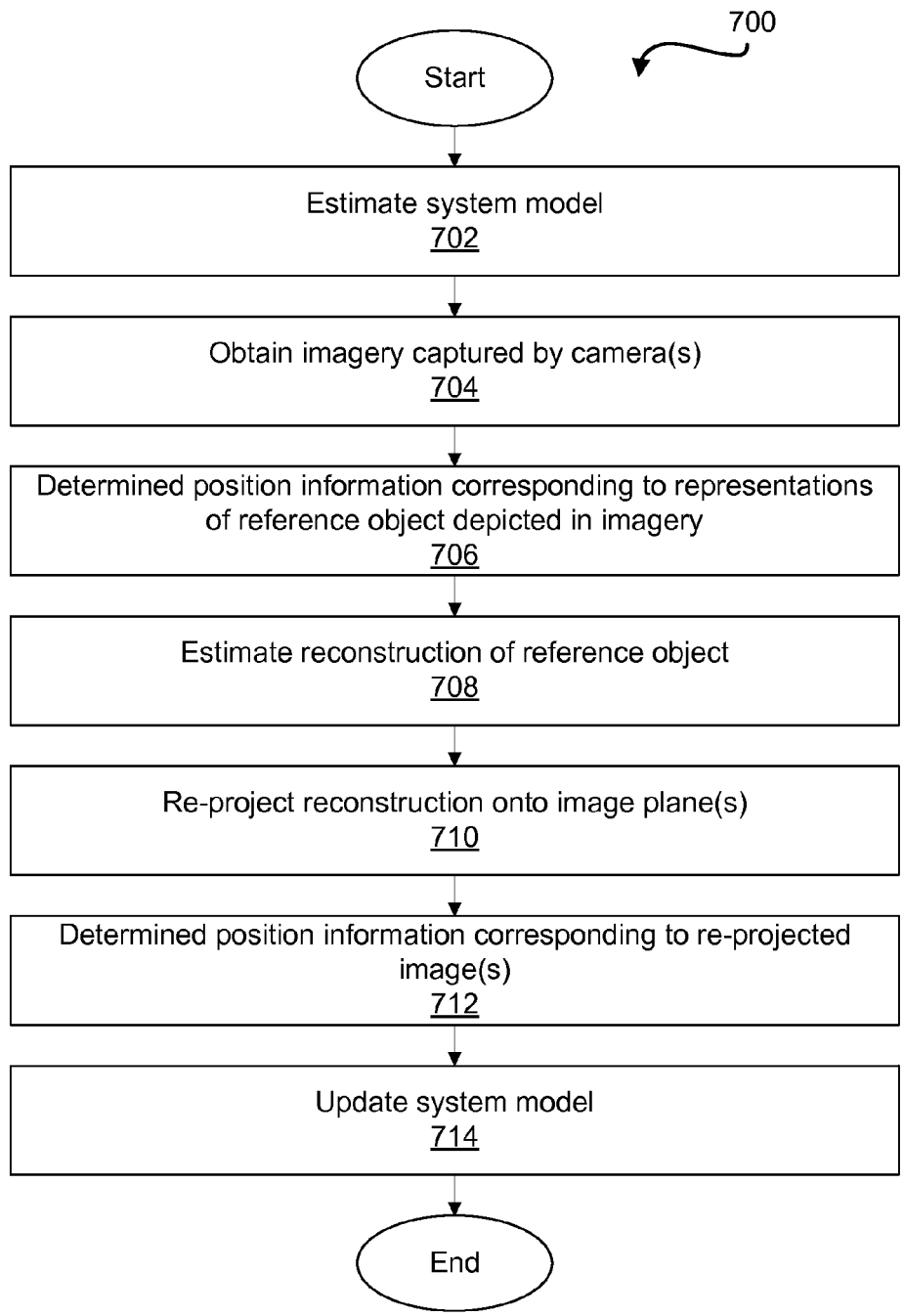
FIG. 7 illustrates a method of calibrating an omnidirectional stereo camera apparatus, in accordance with one or more implementations.

FIG. 7 illustrates a method 700 of calibrating an omnidirectional stereo camera apparatus, in accordance with one or more implementations. In some implementations, the method 700 may correspond to calibrating an omnidirectional stereo camera apparatus the same as or similar to omnidirectional stereo camera apparatus 100 (see, e.g., FIGS. 1 and 8).

The operations of method 700 presented below are intended to be illustrative. In some implementations, method 700 may be accomplished with one or more additional operations not described and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

In some implementations, the method 700 may be implemented onboard an omnidirectional stereo camera apparatus including one or more physical processors (see, e.g., one or more processor 112 in FIG. 1). In some implementations, method 700 may be implemented in one or more processing devices that are external to an omnidirectional stereo camera apparatus. For example, one or more processing devices may be remote from an omnidirectional stereo camera apparatus and may communicate with the omnidirectional stereo camera apparatus over a communication network. A communication network may include a wireless network such as the Internet, Wi-Fi, Bluetooth, NFC, and/or other wireless network. A communication network may include a wired network such as USB, ethernet, and/or other wired network.

Figure 8:
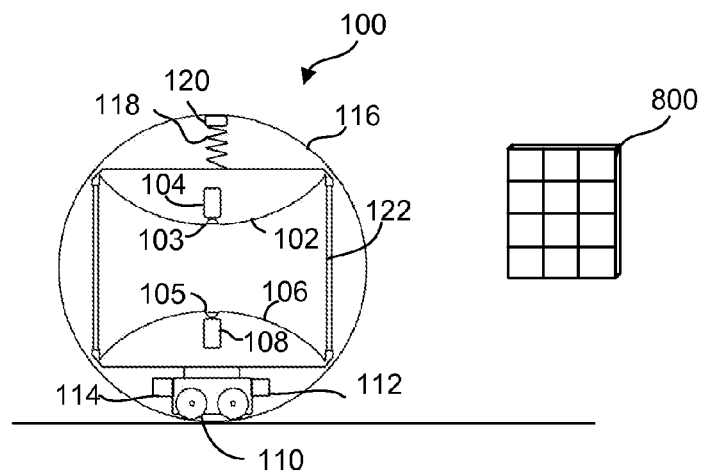
FIG. 8 illustrates a setup for calibrating an omnidirectional stereo camera apparatus, including a reference object placed in the vicinity of the omnidirectional stereo camera apparatus, in accordance with one or more implementations.

FIG. 8 illustrates a calibration setup including omnidirectional stereo camera apparatus 100. During calibration, a reference object 800 may be placed in three-dimensional space at or near the omnidirectional camera apparatus 100. By way of non-limiting example, the reference object 800 may be positioned and/or arranged in three-dimensional space such that images captured by the first camera 104 may include representations of the reference object 800 reflected off the second convex mirror 106. Images captured by the second camera 108 may include representations of the reference object 800 reflected off the first convex mirror 102. In some implementations, the reference objet 800 may include a checkerboard pattern including a distinct shape and/or pattern. However, other configurations of a reference object 800 are also contemplated.

Figure 9:
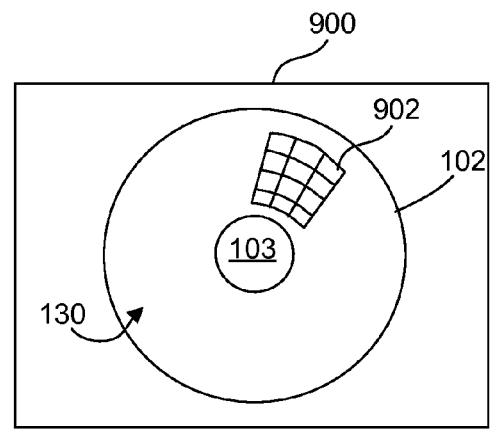
FIG. 9 illustrates an image of a first convex mirror, including a reflection of a reference object used during calibration, in accordance with one or more implementations.

FIG. 9 illustrates an exemplary image 900 captured by the second camera 108 in the setup of FIG. 8. The image 900 may depict the first convex mirror 102 including a reflection 902 of the reference object 800 (see, e.g., FIG. 8). It is noted that the image 900 may also depict other objects reflected off the first convex mirror 102 that are not currently shown, for clarity.

Figure 10:
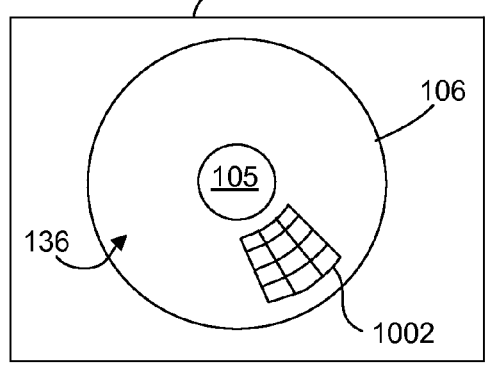
FIG. 10 illustrates an image of a second convex mirror, including a reflection of a reference object used during calibration, in accordance with one or more implementations.

FIG. 10 illustrates an exemplary second image 1000 captured by the first camera 104 in the setup of FIG. 8. The second image 1000 may depict the second convex mirror 106 including a second reflection 1002 of the reference object 800 (see, e.g., FIG. 8). It is noted that the image 1000 may depict other objects reflected off the second convex mirror 106 that are not currently shown, for clarity.

Referring back to method 700 in FIG. 7, at an operation 702, system models may be estimated. The overall system model may include estimations of one or more of the shapes and/or positions of convex mirrors, positions of one or both of the first and second cameras, and/or other components included in the omnidirectional camera apparatus. By way of non-limiting example, the first system model may comprise estimates of one or more of a first shape of a first convex mirror, a second shape of a second convex mirror, a first position of the first convex mirror, a second position of the second convex mirror, a third position of a first camera, a fourth position of a second camera, and/or other estimations. In some implementations, one of more of the first position, second position, third position, and/or fourth position may be initially established as a fixed origin position within the system model.

In some implementations, the estimated mirror shapes may correspond to mirror shapes having assumed central intersection points (see, e.g., FIG. 11). In some implementations, the estimated mirror shapes may be based on fitting one or more surface equations to a surface and/or interpolating over data points measured during calibration (see, e.g., operation 706). In some implementations, the equations may include angle-dependent parameters that may facilitate assumption of rotationally unsymmetrical models of the mirrors. In some implementations, an equation may assume radial symmetry. By way of non-limiting example, an equation may correspond to one or more hyperbolas fitted at discrete steps around a mirror (e.g., facilitating the assumption of radial asymmetry), a polynomial function fitted to the surface assuming radial symmetry, a polynomial function with additional terms for modeling asymmetries with Fourier series, and/or other functions.

In some implementations, an equation to estimate or model a shape of a mirror using hyperbolas fitted to the surface and interpolating may be expressed as:

$$z(r, \phi) = b(\phi) - \frac{b(\phi)}{a(\phi)} \sqrt{(r - 10 \text{ mm})^2 + a(\phi)^2} . \qquad \text{Eq. 1}$$

wherein parameters a and b may be defined at discrete steps around the mirror. By way of non-limiting example, parameters a and b may be defined at $$\phi = 0, \phi = \frac{\pi}{2}, \phi = \pi, \phi = \frac{3\pi}{2},$$

and/or other discrete step. Parameters a and b may be defined at these and/or other steps when interpolation over four (or other amount) hyperbolas. Parameters a and b may be angle dependent parameters allowing for a rotationally unsymmetrical model of the mirror.

In some implementations, an equation to estimate or model a shape of a mirror using a polynomial fitted to a surface under the assumption of radial symmetry around the mirror's central axis may be expressed as:

$$z(r) = a_0 r + a_1 r^2 + a_2 r^4 + \ldots + a^k r^{2k} k \in N \qquad \text{Eq. 2.}$$

In some implementations, an equation to estimate or model a shape of a mirror may use an polynomial as in Equation 2 and including additional terms for modelling the $2\pi$-period asymmetries with Fourier series.

At an operation 704, imagery captured by the first camera and the second camera may be obtained. The imagery may depict a reference object positioned in three-dimensional space adjacent the omnidirectional stereo camera (see, e.g., FIGS. 9 and 10. For example, the imagery may include a first image comprising a first representation of the reference object captured by the first camera (see, e.g., FIG. 10). The imagery may include a second image comprising a second representation of the reference object captured by the second camera (see, e.g., FIG. 9).

At an operation 706, first position information corresponding to the first representation of the reference object in the first image and second position information corresponding to the second representation of the reference object in the second image may be determined. Position information may correspond to position and/or orientation of two-dimensional points detected in an image (e.g., based on a two-dimensional coordinate system). In some implementations, the first and second position information may be determined based on object recognition techniques and/or other techniques. By way of non-limiting example in FIG. 9, first position information may correspond to positions and/or orientations of detected corners of the individual squares shown in the representation 902 of the reference object in the captured reflection of the first convex mirror 102. By way of non-limiting example, in FIG. 10, second position information may correspond to positions and/or orientations of detected corners of the individual squares shown in the representation 1002 of the reference object in the captured reflection of the second convex mirror 106.

Returning to FIG. 7, at an operation 708, a virtual reconstruction of the reference object may be estimated based on the first system model, first position information, second position information, and/or other information. By way of non-limiting example, two-dimensional coordinates of detected points in the images may be transformed into points in three-dimensional space using the first system model comprising estimations of the mirrors and/or camera, stereoscopic scene reconstruction techniques, and/or other processes. The reconstruction may be a three-dimensional reconstruction and/or information defining a three-dimensional reconstruction of the reference object.

At an operation 710, the virtual reconstruction of the reference object may be reprojected onto two-dimensional image planes. By way of non-limiting example, the reconstruction of the reference object may be reprojected onto a first plane, a second plane, and/or other planes.

At an operation 712, third position information corresponding to the reprojected reconstruction of the reference object in the first plane and fourth position information corresponding to the reprojected reconstruction of the reference object in the second plane may be determined. Position information corresponding to the reprojected reconstruction of the reference object may include two-dimensional coordinates of detected points associated with the reprojected reconstruction of the reference object in the first and second image planes.

At an operation 714 the first system model may be updated based on the reprojected images. For example, a reprojection error may be calculated and used to update the first system model. A reprojection error may correspond to discrepancies between the positions and/or orientations of the reprojected reconstructions of the reference object and the detected positions and/or orientations of the representations of the reference object in the initially captured images. The reprojection error may correspond to a difference in the two-dimensional coordinates of the detected points of the reference object (e.g., the corners of the checkerboard) in the first and second images and the two-dimensional coordinates of corresponding points in the first and second planes, respectively. By way of non-limiting example, the first system model may be updated based on one or more of a first difference between the first position information and the third position information, a second difference between the second position information and the fourth position information, and/or other information. By way of non-limiting example, the estimation of the first shape of the first convex mirror and/or other estimations of the first system model may be updated based on the first difference and/or other information. The estimation of the second shape of the second convex mirror and/or other estimations of the first system model may be updated based on the second difference and/or other information.

In some implementations, operations 708-714 may be performed over one or more iterations. The first system model may continue to be updated over these iterations until a reprojection error may be minimized and/or eliminated. At that point, the best model/estimations of the convex mirrors and/or cameras may be determined and/or a minimized reprojection error may be known.

As illustrative example, a subsequent iteration may include one or more of the following operations: estimating a second reconstruction of the reference object based on the updated first system model, the first position information, and/or the second position information; reprojecting the second reconstruction of the reference object onto image planes such that the second reconstruction of the reference object is reprojected onto a third plane and a fourth plane; determining fifth position information corresponding to the second reprojected reference object in the third plane and sixth position information corresponding to the second reprojected reference object in the fourth plane; further updating the updated first system based on the second reprojections such that the updated first system model may be further updated based on one or more of a third difference between the first position information and the fifth position information, a fourth difference between the second position information and the sixth position information, and/or other information; and/or other operations.

Returning to FIG. 1, the first camera 104, second camera 108, drive mechanism 110, one or more processors 112, and/or other components of the omnidirectional camera apparatus 100 may be operatively linked via one or more electronic communication links. For example, such electronic communication links may be established, at least in part, via a network such as a wide area network (e.g., the Internet), a local area network, and/or other networks. By way of non-limiting example, communications routed to and/or from the omnidirectional camera apparatus 100 may be facilitated by the communication component 114 and/or other components. It will be appreciated that this is not intended to be limiting, and that the scope of this disclosure includes implementations in which the first camera 104, second camera 108, drive mechanism 110, one or more processors 112, and/or other components may be operatively linked via some other communication media.

In some implementations, the omnidirectional camera apparatus 100 may include one or more processors 112, electronic storage (not shown), and/or other components. The one or more processors 112 may include communication lines or ports to enable the exchange of information with a network, other processors, and/or processing devices. Illustration of one or more processors 112 in FIG. 1 is not intended to be limiting. The one or more processors 112 may include a plurality of hardware, software, and/or firmware components operating together to provide the functionality attributed herein to the one or more processors 112. For example, one or more processors 112 may be implemented by a cloud of computing platforms operating together as one or more processors 112.

Electronic storage may comprise electronic storage media that electronically stores computer-readable information. The electronic storage media of electronic storage may include one or both of system storage that is provided integrally (i.e., substantially non-removable) with one or more processors 112 and/or removable storage that is removably connectable to one or more processors 112 via, for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage may store software algorithms, information determined by one or more processors 112, information received from user interfaces, and/or other information that enable one or more processors 112 to function as described herein.

Processor(s) 112 is configured to provide information processing capabilities in omnidirectional camera apparatus 100. As such, processor(s) 112 may include one or more of a digital processor, an analog processor, a digital circuit designed to process information, an analog circuit designed to process information, a state machine, and/or other mechanisms for electronically processing information. Although processor(s) 112 is shown in FIG. 1 as a single entity, this is for illustrative purposes only. In some implementations, processor(s) 112 may include one or more processing units. These processing units may be physically located within the same device, or processor(s) 112 may represent processing functionality of a plurality of devices operating in coordination. The processor(s) 112 may be configured to execute computer-readable instruction by software; hardware; firmware; some combination of software, hardware, and/or firmware; and/or other mechanisms for configuring processing capabilities on processor(s) 112.

Although the present technology has been described in detail for the purpose of illustration based on what is currently considered to be the most practical and preferred implementations, it is to be understood that such detail is solely for that purpose and that the technology is not limited to the disclosed implementations but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. An omnidirectional stereo camera system, comprising:
a first convex mirror having a first principle axis, a first mirrored surface, and a first central portion disposed along the first principle axis, the first central portion being configured to allow light to pass through the first central portion;
a second convex mirror having a second principle axis, a second mirrored surface, and a second central portion disposed along the second principle axis, the second central portion being configured to allow light to pass through the second central portion, the first convex mirror and the second convex mirror being arranged such that the first principle axis and the second principle axis are aligned and the first mirrored surface and the second mirrored surface face each other without obstruction of a space between the first mirrored surface and the second mirrored structure;
a first camera disposed behind the first convex mirror and aligned with the first principle axis such that light passing through the first central portion of the first convex mirror impinges on the first camera; and
a second camera disposed behind the second convex mirror and aligned with the second principle axis such that light passing through the second central portion of the second convex mirror impinges on the second camera; and
wherein the first camera disposed behind the first convex mirror is configured to capture imagery reflected by the second mirrored surface, and wherein the second camera disposed behind the second convex mirror is configured to capture imagery reflected by the first mirrored surface.

2. The omnidirectional stereo camera system of claim 1, wherein the first central portion is an aperture in the first convex mirror, and wherein the second central portion is an aperture in the second convex mirror.

3. The omnidirectional stereo camera system of claim 1, wherein the first central portion is a transparent or semitransparent portion of the first convex mirror, and wherein the second central portion is a transparent or semitransparent portion of the second convex mirror.

4. The omnidirectional stereo camera of claim 1, wherein the first convex mirror, the first camera, the second convex mirror, and the second camera comprise part of a movable robot.

5. The omnidirectional stereo camera of claim 1, further comprising:
a spherical shell housing at least the first convex mirror, the first camera, the second convex mirror, and the second camera; and wherein the positioning of the first convex mirror, the first camera, the second convex mirror, and the second camera within the spherical shell is such that the center of gravity of the omnidirectional stereo camera system is offset from a center point of the spherical shell.

6. The omnidirectional stereo camera of claim 5, wherein the first convex mirror, the first camera, the second convex mirror, and the second camera comprise part of a unitary structure within the spherical shell, and wherein the shell rotates independently from the unitary structure.

7. The omnidirectional stereo camera of claim 6, wherein the unitary structure includes a drive mechanism configured to drive rotational motion of the spherical shell independently from the unitary structure to facilitate traversal of the omnidirectional stereo camera over a surface.

8. The omnidirectional stereo camera of claim 1, wherein the first convex mirror is defined by a cross-sectional profile, wherein the profile comprises a first portion defined by a hyperbolic function, the first portion encompassing a first area between an edge of the first convex mirror and an intermediate location located between the edge and a central portion of the first convex mirror, and second portion defined by a linear or quadratic function, the second portion encompassing a second area between the intermediate location and the central portion.

9. The omnidirectional stereo camera of claim 1, further comprising one or more physical processors coupled to the first camera and/or second camera, wherein the one or more physical processors are configured by computer-readable instructions to:
  receive first information from the first camera and second information from the second camera, the first information describing a first image captured by the first camera, the first image depicting a first object reflected off the second convex mirror, the second information describing a second image captured by the second camera, the second image depicting the first object reflected off the first convex mirror; and
  determine a position and/or orientation of the first object within three-dimensional space based on the received first and second information.

* * * * *